Figure 1:
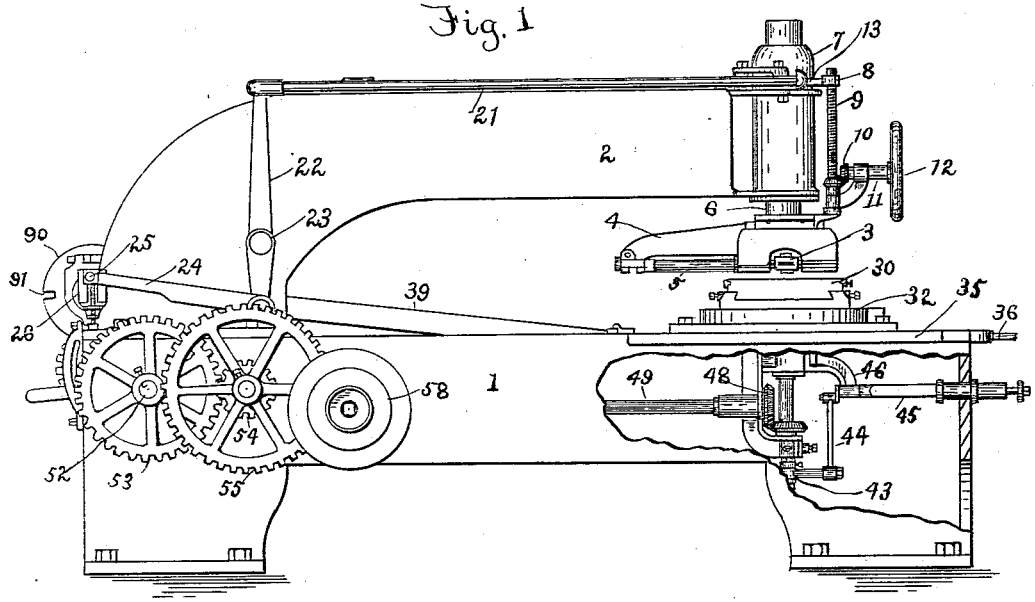

(No Model.) 3 Sheets—Sheet 1.

F. H. VAN HOUTEN.
MOLDING MACHINE.

No. 557,627. Patented Apr. 7, 1896.

Witnesses
H. E. Bates
Thomas Durant

Inventor
Frank H. Van Houten
by Church & Church
his Attorneys.

(No Model.) 3 Sheets—Sheet 3.
F. H. VAN HOUTEN.
MOLDING MACHINE.
No. 557,627. Patented Apr. 7, 1896
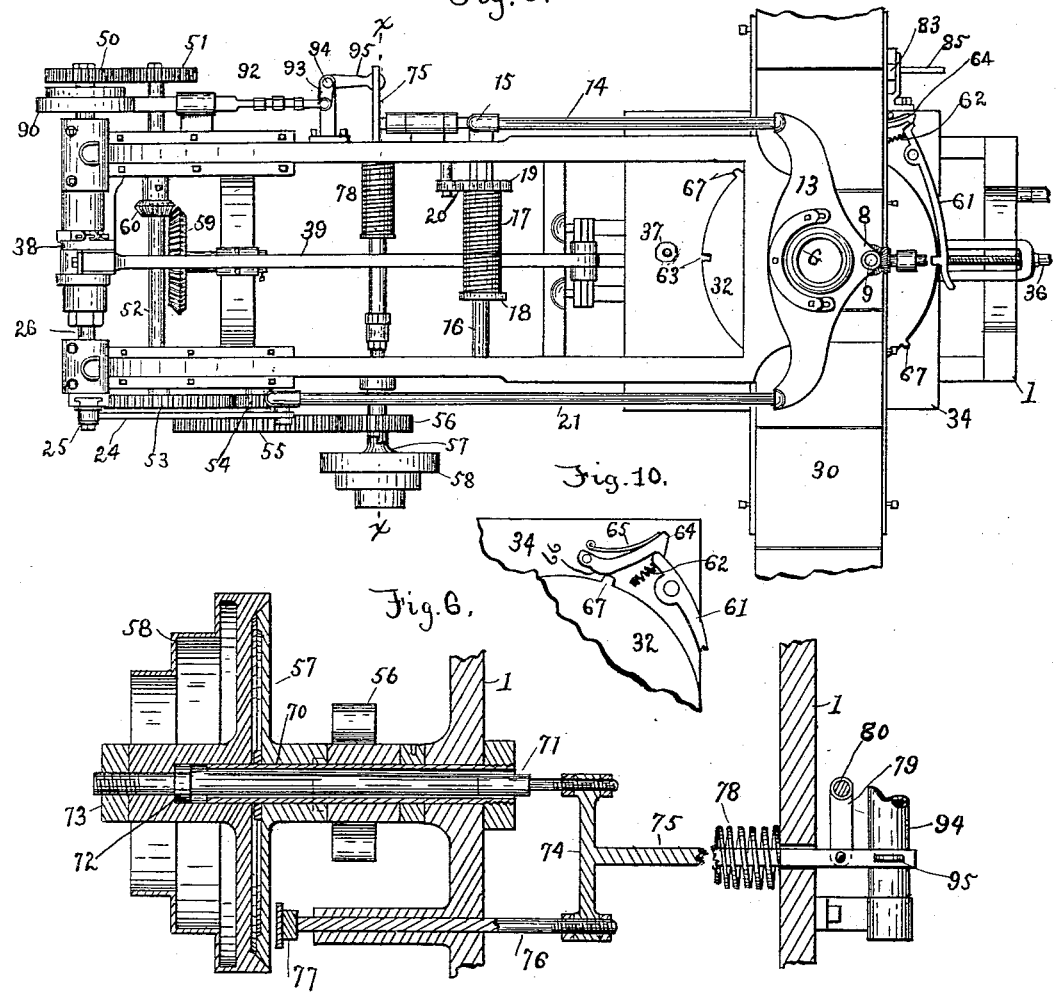
Fig. 5.
Fig. 10.
Fig. 6.
Fig. 7.
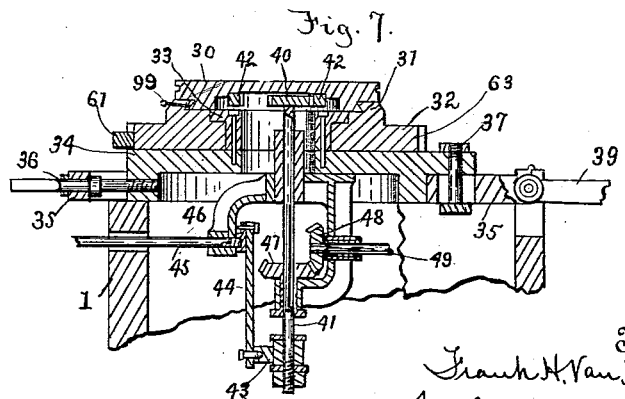
Witnesses
J+E Bates.
Thomas Durant
Inventor
Frank H. Van Houten
Church + Church
his Attorneys

UNITED STATES PATENT OFFICE.

FRANK HENRY VAN HOUTEN, OF MATTEAWAN, NEW YORK, ASSIGNOR TO CHARLES L. GOEHRING, OF ALLEGHENY, PENNSYLVANIA.

MOLDING-MACHINE.

SPECIFICATION forming part of Letters Patent No. 557,627, dated April 7, 1896.

Application filed July 11, 1895. Serial No. 555,630. (No model.)

*To all whom it may concern:*

Be it known that I, FRANK HENRY VAN HOUTEN, of Matteawan, in the county of Dutchess and State of New York, have invented certain new and useful Improvements in Molding-Machines; and I do hereby declare the following to be a full, clear, and exact description of the same, reference being had to the accompanying drawings, forming a part of this specification, and to the reference numerals and letters marked thereon.

My present invention has for its object to improve the construction and operation of that class of molding-machines shown in Letters Patent granted to me August 9, 1892, embodying an oscillatory cutter-head and a laterally and longitudinally movable work-support; and it consists in the organization of a machine for producing complete moldings for panels, &c., all as will be hereinafter fully described, and the novel features pointed out in the claims at the end of this specification.

Figure 2:
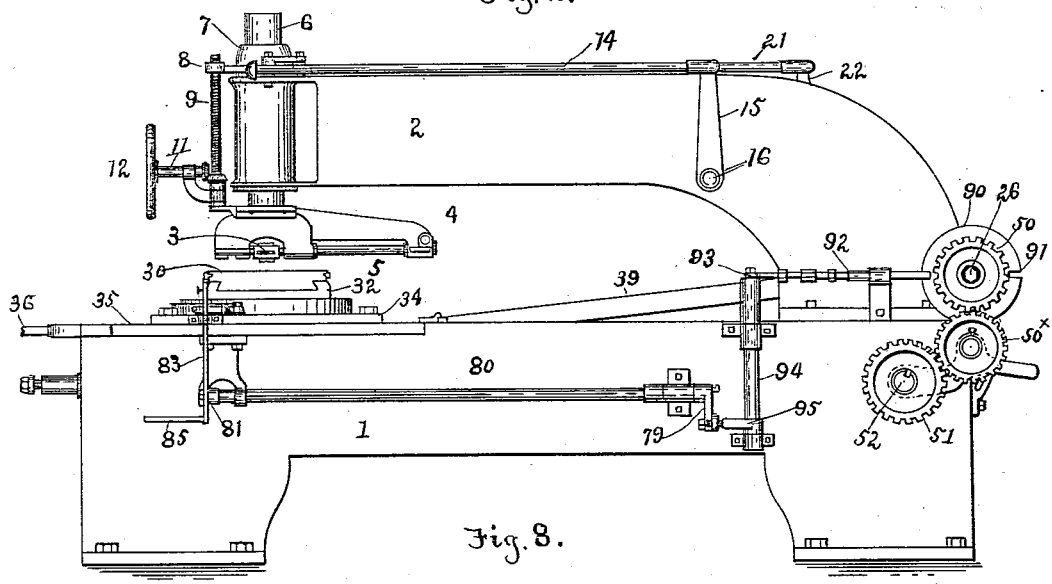
Figure 3:
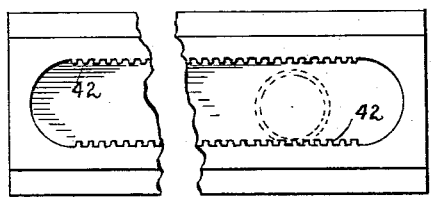
Figure 4:
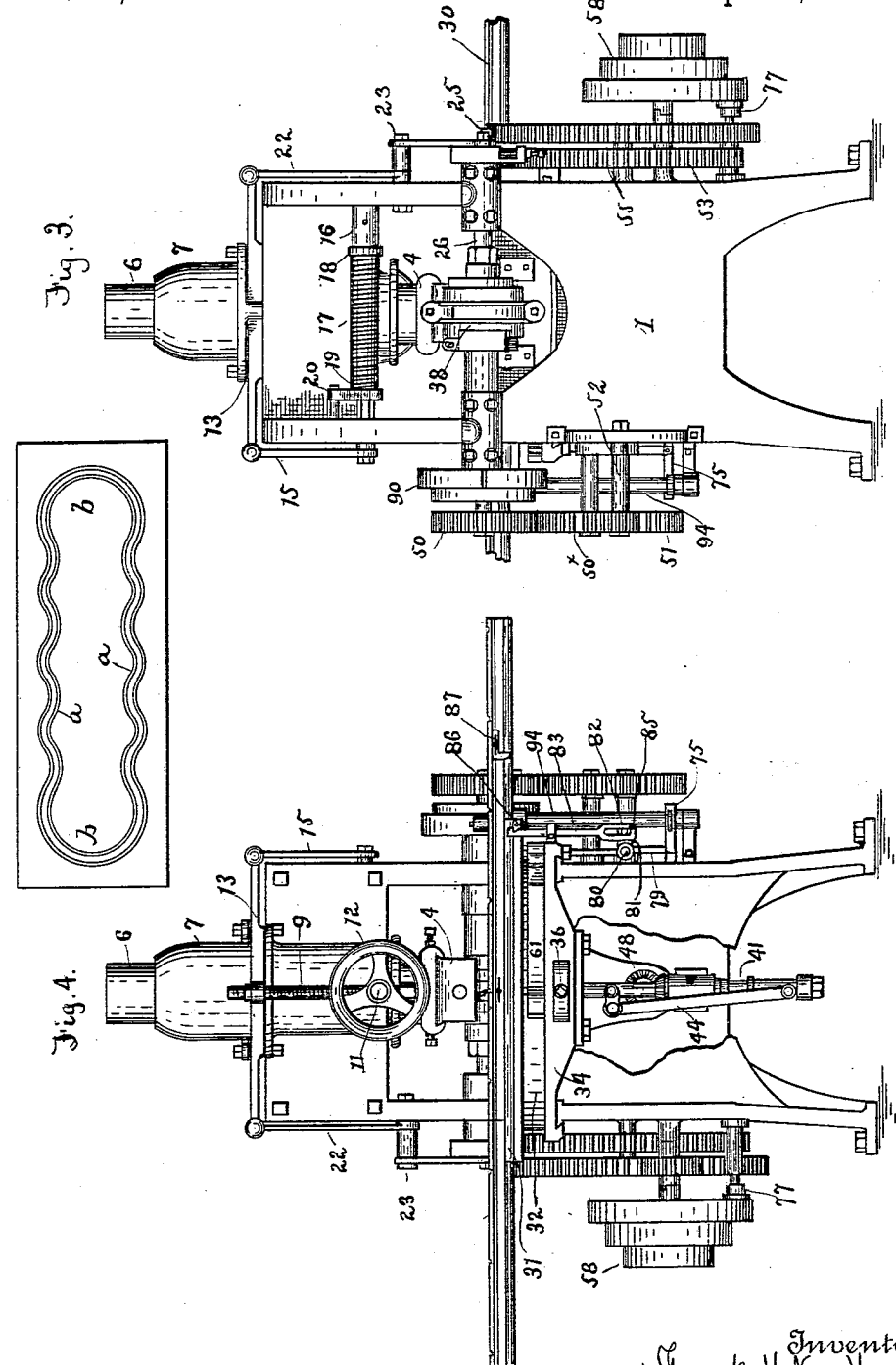

In the drawings, Figures 1 and 2 are elevations of opposite sides of the machine; Fig. 3, a rear view of the same; Fig. 4, a front view of the same; Fig. 5, a plan view; Fig. 6, a section on the line *x x* of Fig. 5; Fig. 7, a longitudinal sectional view of the work-support; Fig. 8, a bottom plan view of the work-support; Fig. 9, a diagrammatic view representing a complete design or panel. Fig. 10 is a detail plan view of the turret 32 and locking means therefor.

Similar reference numerals and letters in the several figures indicate similar parts.

1 indicates the frame of the machine, of any desired or approved construction, provided with an overhanging frame or arm 2 to accommodate and sustain the oscillatory cutter-head.

3 is the cutter-head provided with suitably-shaped bits or cutters and secured upon an arbor mounted in an arbor-frame 4 and carrying a driving-pulley 5. The arbor-frame is pivotally supported in the arm 2, so as to be capable of an oscillatory movement about a vertical axis secured in or to a vertical post 6, mounted in bearings in or on the arm 2. The connection between the arbor-frame 4 and the post 6 is one permitting of the lateral adjustment of the cutter-head with respect to the axis of oscillation, which may be effected by forming ways upon the post and fitting the arbor-frame to slide upon said ways, suitable means being employed for clamping the arbor-frame in adjusted position. Upon the post 6 is fitted a collar 7 connected thereto in a manner to permit the longitudinal motion of the one with respect to the other, but at the same time compels them to rotate in unison. Such a connection may be formed by a groove in the one and a spline or key on the other. Through an arm 8, preferably forming part of a yoke 13, secured to the collar 7, is passed a screw-shaft 9, its lower threaded portion being swiveled to the lower part of the post 6, so as to turn freely therein to prevent it from longitudinal movement with relation to it, and to this shaft is connected a beveled pinion meshing with a corresponding pinion 10 on the end of a short shaft 11, carrying a hand-wheel 12, by operating which latter the post and arbor-frame can be adjusted vertically, as will be understood.

The following means are provided for effecting and controlling the oscillatory movements of the cutter-head and its arbor: The yoke 13, secured to the upper end of the collar 7, is provided with two arms projecting on opposite sides of the center, one of them having a hemispherical bearing for the end of a thrust-rod 14, the other end of which engages with an arm 15 on a rock-shaft 16 oscillated in one direction by a spring 17 connected at one end to a collar 18 on said shaft and at the other to a ratchet-wheel 19, with which a suitable pawl 20 coöperates, said spring serving, through the parts described, to oscillate the arbor-frame in one direction. A thrust-rod 21 engages with the other arm of the plate 13, the rear end of said rod being operated upon by one end of a lever 22 pivoted at 23 to the main frame and connected by a pitman 24 with an adjustable crank-pin 25 on a shaft 26 at the rear of the machine. The rotation of this shaft, it will be seen, will operate the lever 22 and oscillate the arbor-frame in the opposite direction from that caused by the spring before described. The spring acts in opposition to the thrust of the adjustable crank-pin, which may be considered a pattern-cam, and holds all the parts pressed toward the crank, thus preventing lost motion, and compels the post and the cutter-head borne thereby to follow the motions inaugurated by said crank or pattern-surface.

In common with the machine described in my previous patent, the lateral motions necessary to the production of the designs and to accommodate the varying angular positions of the arbor with respect to the actual line of direction of the feed movement are effected through the medium of the work support or table over which the material is fed or by which it is carried.

The present machine is especially designed for what is known as "panel-work," and is provided with a carriage 30 having suitable slots in its face for the accommodation of bolts, dogs, or other suitable devices for holding the material being operated upon securely upon it. This carriage is mounted and moved longitudinally in ways 31 formed upon a turret-head 32 held by a flanged ring 33 upon a plate 34, which latter is adjustably mounted upon a slide 35 operating in suitable ways on the main frame. The plate 34 is adapted to be adjusted relative to the slide by means of an adjusting-screw 36 and held in position when properly adjusted by bolts 37, as shown in Fig. 7. The slide 35 is given a back-and-forth movement on the ways by means of an adjustable pattern-cam 38 on the shaft 26 through a connecting-rod 39 pivoted to the slide and strapped to the cam, as shown in Fig. 5.

From the above it will be seen that the carriage or work-support 30 is permitted a movement laterally of the main frame and that the turret-head on which it is mounted is permitted a rotary movement on the slide, which latter is capable of a back-and-forth movement by the means just described. The longitudinal movement or feed motion of the carriage 30 may be effected through the agency of a gear-wheel 40 mounted upon a vertical axis or shaft 41 engaging the teeth of a rack 42 on the under side of said carriage.

With the addition of suitable driving mechanism moving the shaft 26 carrying the pattern-cams and the shaft 41 carrying the gear 40, so that these parts will be driven at the proper relative speeds to produce the given designs, the machine thus far described is capable of forming moldings or designs running longitudinally of the plank or blank operated upon; but special provision is necessary to enable panel-work to be performed expeditiously and accurately. Thus by reference to Fig. 9 the machine is competent to form designs running lengthwise of the blank, as represented at *a a;* but in order to finish the panel it is necessary to connect the corresponding ends of the two side lines by lines of molding, as represented by *b b*.

Before describing the means provided for forming panel designs I will refer, briefly, to the driving mechanism or gearing shown for producing and insuring the proper movements of the actuating devices.

The pattern-cam shaft 26 is provided upon one end with a pinion 50, with which meshes a pinion $50^\times$ operated by a pinion 51 on the transverse shaft 52, on the other end of which latter is mounted a gear 53 meshing with a pinion 54 on a stud-shaft, to which is connected a gear 55 meshing with a pinion 56 on a clutch member 57 arranged to be driven from a belt wheel or pulley 58, as will be presently described.

The shaft 41 on which the pinion 40 is mounted is supported at its lower end on an arm 43 connected by a pitman 44 with a crank on a shaft 45 journaled in a frame 46 serving to give the proper support to said shaft 41, while the lower part passes through a beveled gear 47 held in the frame 46, but splined to the shaft 41, so as to rotate the latter, though it is permitted a vertical movement through it. A pinion 48 splined to the shaft 49 operates to drive the pinion 47 and the connected shaft, said shaft 49 being driven in turn from the shaft 52 by a gear 59 on its outer end meshing with a beveled pinion 60 on said shaft 52, as shown in Figs. 5 and 7.

The carriage 30 is provided with the two racks 42, one on either side, and the shaft 41 is arranged to one side of the axis about which the turret moves, so that when the carriage is in position to feed the material longitudinally the gear 40 will engage one rack and when the turret is rotated upon its axis to reverse the position of the blank and feed-motion the opposite rack will be brought into position to engage gear 40. In order that the turret may be locked in proper position with the support 30 transverse of the main frame, I pivot upon the plate 34 a pawl 61 having a projection at its end and operated upon by a spring 62 to move said projection into a suitable notch 63 formed in the turret 32. I preferably provide two notches in the turret-head arranged on opposite sides thereof, so that it will be locked at each half-revolution, and at the heel of the pawl 61 is arranged a catch 64 actuated by a spring 65 in a direction to engage the heel of the pawl when thrown out of engagement with the notch 63 in the turret to hold the pawl out of engagement while the turret is being turned, said catch being provided with an extension 66 adapted to be engaged by a projection 67 on the turret-head, so that the pawl will be released from the catch and allowed to bear on the edge of the head before the notch is in line with the projection on the pawl so as to insure the proper engagement and arrest of the turret.

The clutch-section 58 embodying a belt-pulley is loosely mounted upon a stationary sleeve 70 secured to the main frame, and to this section is connected a rod 71 having a collar 72 and a nut 73 on its outer end and connected at its inner end to a yoke 74 forming part of or attached to a thrust-rod 75 extending clear across the machine and projecting at the other side. Connected to the yoke 74 is a rod 76 passing through a suitable guide in the frame 1 and having a pad 77 adapted, when moved in one direction, to engage the clutch-section 57 connected to the train of gear. From this construction it will be seen that when the rod 75 and connected yoke are moved to the left, Fig. 6, the clutch-sections will be disengaged and the machine arrested at once by the engagement of the pad with the clutch-section 57. The rod 75 is moved in a direction to cause the disengagement of the clutch by a spring 78, and to the outer end of said rod is pivoted a crank 79, secured to a horizontal shaft 80, extending to the front of the machine and provided on its front end with a crank 81 having a pin 82 operating in a slot formed in a vertically-sliding supporting-link 83 arranged on the plate 34. This link is provided with a handle 85 for raising it, and its upper end is provided with a hook adapted, when the link is raised, to engage a projection 86 arranged on the plate 34, and to the side of the carriage 30 is secured an adjustable projection or abutment 87 adapted, when the carriage reaches the limit of its longitudinal movement, to engage the end of the link, disengage the hook from the projection 86, and permit the shaft 80 to be rotated and the clutch to be thrown out of engagement by the spring 78. The object of this arrangement is to insure the arrest of the machine at the proper time, so that when the gear 40 operating the work-support is dropped it may be readily engaged again with the rack on said support. In order that the movement of the shaft carrying the pattern-cam may be arrested at just the proper point, I provide upon the shaft 26 a disk 90 having the two notches 91 in opposite sides, with either of which is adapted to coöperate a sliding bolt 92 pivoted to the end of a crank 93 on a vertical rock-shaft 94, having at its lower end a crank 95 with the end projecting through and actuated by the rod 75 connected to the clutch. It will be seen that when the rod 75 is permitted to be actuated by its spring to disengage the clutch and arrest the machine the shaft 94 will be oscillated and the bolt 92 projected into one of the notches 91 in the disk 90. If the clutch-retaining devices should be released by the dropping of the link before one of the notches 91 comes in line with the bolt 92, the latter will be held against the surface of the disk and the disengagement of the clutch delayed until the proper point in the revolution in the pattern-cam shaft is reached. In the drawings the pattern-shaft 26 is shown arrested, while in Fig. 6 the clutch is shown engaged for the more convenient illustration of the parts.

The mode of operation to be pursued in forming panels and like articles wherein the figure is composed of two or more waved or irregular lines of molding intersecting at an angle and formed one a continuation of the other is as follows: The various devices controlling the oscillation of the cutter-head and the feed-motion and the lateral reciprocation of the carriage having been properly set to produce the required design, the turret is fastened to the support, the carriage is drawn to one extreme of the feed movement—namely, to the beginning of one of the side lines $a$, Fig. 9—and the shaft 41 is raised until the teeth of the gear 40 mesh with those of the rack on the carriage. Then the link 83 is raised and the hook at its end engaged with the projection 86 on the plate 34. This will serve to engage the clutch and disengage the bolt 92 from the disk 90, and the lateral movement of the carriage 30 will be commenced, and the lines $a$ of the panel cut, as will be understood. When the carriage reaches the end of its movement, the link 83 will be disengaged, as described, and the machine stopped, then the gear 40 is disengaged from one of the racks on the under side of the carriage 30, and if the end of the panel is to be provided with a symmetrical curve joining the two side moldings $a$, the axial center of the turret must be in the vertical plane of the arbor of the cutter-head, but to one side of the axis about which the cutter-head oscillates, the cutter-head being at the center—that is, midway of the oscillations—so that the arbor will stand on a line radial to the center of the turret. The parts are so constructed that the machine will stop at just this point. The pawl 61 is now disengaged from the turret and the turret and carriage are turned about their pivotal center, the pawl being held out of engagement by the catch 64 until the latter is released by the projection 67, as before described, and when the head has made a half-revolution it will be arrested with the other side of the panel beneath the cutter-head. During this rotary movement the carriage has been locked to the cutter-head by a bolt 99 (see Fig. 7) and the cutter-head has formed the part $b$ of the panel, sweeping in the arc of the circle. Owing to the fact that the shaft of the gear 40 is located to one side of the center about which the turret was turned as the carriage is reversed—that is, changed end for end upon its support—the opposite rack is brought into position to be engaged by said gear 40, so that upon elevating the gear the carriage and blank will be moved in the same direction relative to the main frame, as before, though the blank will be cut in the opposite direction. When the carriage has been reversed, the gear 40 is engaged with the rack, the screw 99 is released, and the operating parts are set in motion by raising the link 83 controlling the clutch devices, and the operation then proceeds as before, forming the other side of the panel. The remaining side and end are completed by repeating the operation described in forming the first side and end, the cutter being brought back to the starting-point without having been once taken from the cut.

A great variety of designs can be produced by the proper adjustment of the several mechanisms and perfect paneling can be made without joint or break. The movable carriage and its pivoted support or turret may be employed in connection with the oscillatory reciprocating cutting mechanism, such as described in various patents granted to myself and Charles Goehring, in which case the device for reciprocating the support on which the turret is mounted may be disconnected or dispensed with.

It will be noticed that the cutter-head is driven separately from the mechanism governing the feed and oscillatory motions, and therefore that the arbor-frame may be held parallel with the main frame and rotated while the turret and carriage are being reversed.

I claim as my invention—

1. In a machine, the combination with the rotary cutter-head, of the reversible turret and a work support or carriage thereon, a pawl for locking the turret from rotation, and a catch for holding the pawl adapted to be released by the movement of the turret, substantially as described.

2. In a machine, the combination with the rotary cutter-head, of the reversible turret having the recesses, and the work support or carriage thereon, the pawl for engaging the recesses, the catch for holding the pawl and the projection on the turret for engaging it and releasing the pawl, substantially as described.

3. In a machine, the combination with the oscillating cutter-head, the movable work-support and the pattern-shaft controlling the movements of the cutter-head and work-support, of the driving-shaft and the clutch between it and the pattern-shaft controlled by the movement of the work-support, substantially as described.

4. In a machine, the combination with the oscillating cutter-head, the movable work support or carriage and the pattern-shaft controlling their movements, of the driving-pulley, the clutch between it and the pattern-shaft, the stop for coöperating with the pattern-shaft, and connections between the stop and clutch controlled by the work-support, substantially as described.

5. In a machine, the combination with the oscillating cutter-head, the work support or carriage and the pattern-shaft controlling their movements, of the driving-pulley, the automatic clutch between it and the pattern-shaft, the notched disk connected to the pattern-shaft, and the stop coöperating therewith connected to the clutch, substantially as described.

6. In a machine, the combination with the oscillating cutter-head, the work support or carriage, and the pattern-shaft controlling their movements, of the driving-pulley, the automatic clutch between it and the pattern-shaft, the disk connected to the shaft, the stop coöperating therewith connected to the clutch, and connections between the work-support and clutch for permitting the operation of the latter, substantially as described.

7. In a machine, the combination with the oscillating cutter-head, the reversible and longitudinally-movable work support or carriage having the racks and the pattern-shaft controlling their movements, of the gear for engaging the racks on the carriage, clutch devices for arresting the operation of the machine, the disk connected to the pattern-shaft, the stop coöperating with the disk and connected to and controlling the clutch devices, substantially as described.

8. In a machine, the combination with the oscillating cutter-head, the reversible, and laterally and longitudinally movable work support or carriage having the racks, and the pattern-shaft controlling their movements, of the gear for engaging the racks on the carriage, clutch devices for arresting the operation of the machine, the disk connected to the pattern-shaft, the stop coöperating with the disk and connected to and controlling the clutch devices, substantially as described.

9. In a machine, the combination with the oscillating cutter-head, the longitudinally-movable work support or carriage, and the pattern-shaft controlling their movements, of clutch devices for arresting the movement of the machine, the disk connected to the pattern-shaft, the stop coöperating with the disk connected to and controlling the movement of the clutch and a trip actuated by the carriage for engaging the stop and disk, substantially as described.

10. In a machine, the combination with the movable cutter-head and work-support, and a pattern-shaft for controlling their relative movements, of an automatic clutch and brake governing the movement of the pattern-shaft, controlled from the pattern-shaft, and a trip actuated by the work-support for permitting the operation of the controlling device, substantially as described.

11. In a machine, the combination with the movable cutter-head and work-support, and a pattern-shaft for controlling their relative movements, of the automatic brake governing the movement of the pattern-shaft, the disk on the pattern-shaft, the stop connected to the clutch coöperating with the disk, the supporting-link connected to the clutch, and the adjustable stop on the work-support for engaging the link, substantially as described.

FRANK HENRY VAN HOUTEN.

Witnesses:
JOHN F. SCHLOSSER,
J. E. VAN HOUTEN.